O. F. SMITH.
SEED PLANTING MECHANISM.
APPLICATION FILED DEC. 27, 1916.
1,282,648.
Patented Oct. 22, 1918.
2 SHEETS—SHEET 1.
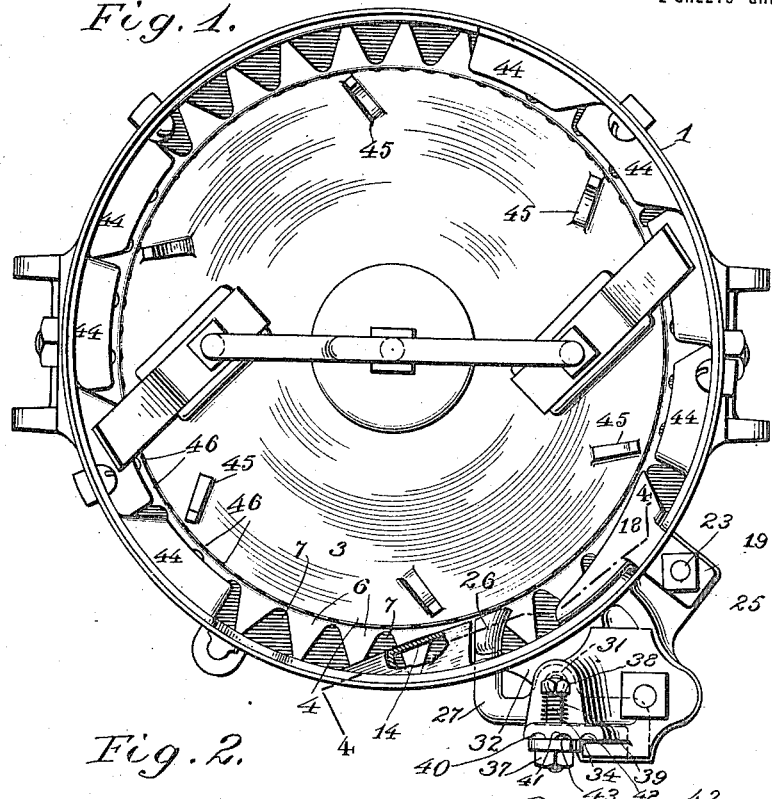
Fig. 1.
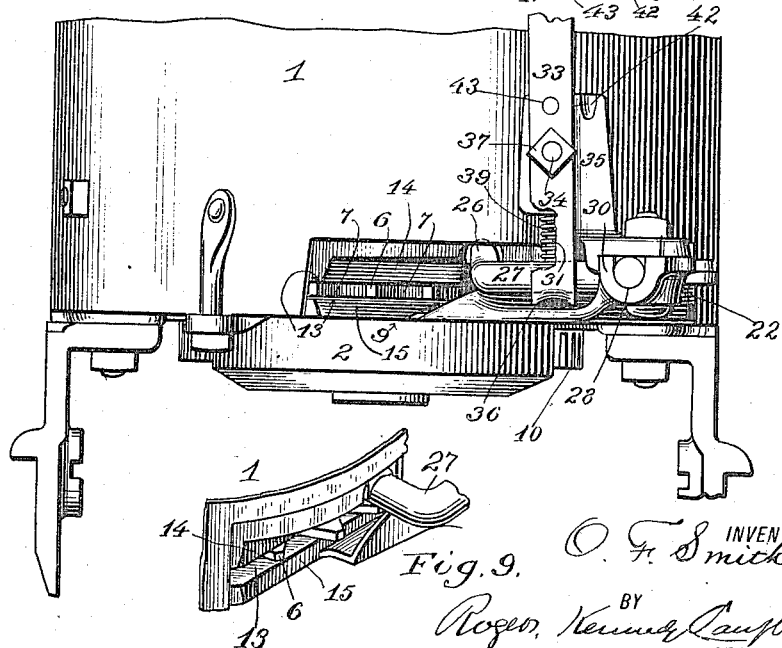
Fig. 2.
Fig. 9.
INVENTOR
O. F. Smith
BY
Rogers, Kennedy Campbell
ATTORNEYS.

O. F. SMITH.
SEED PLANTING MECHANISM.
APPLICATION FILED DEC. 27, 1916.
1,282,648.
Patented Oct. 22, 1918.
2 SHEETS—SHEET 2.
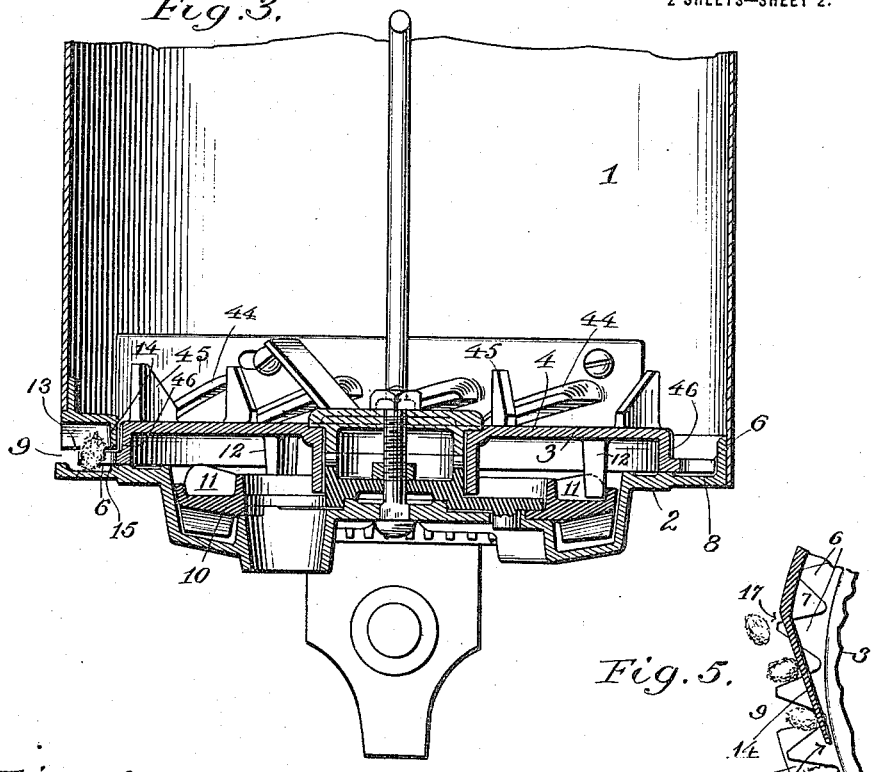
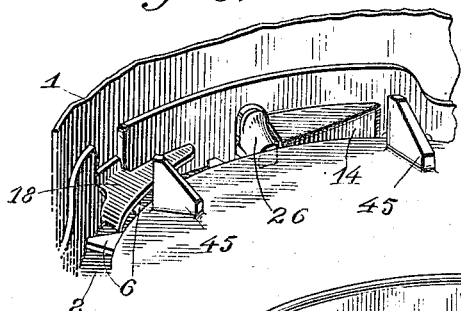
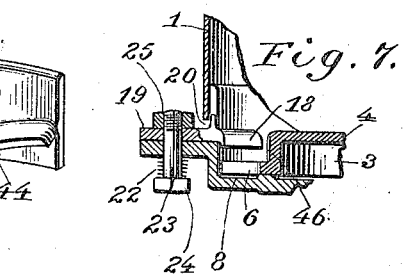
INVENTOR
O. F. Smith
BY
Rogers, Kennedy & Campbell
ATTORNEYS.

UNITED STATES PATENT OFFICE.

ORBIN F. SMITH, OF MOLINE, ILLINOIS, ASSIGNOR TO MOLINE PLOW COMPANY, A CORPORATION OF ILLINOIS.

SEED-PLANTING MECHANISM.

1,282,648.   Specification of Letters Patent.   Patented Oct. 22, 1918.

Application filed December 27, 1916. Serial No. 139,114.

*To all whom it may concern:*

Be it known that I, ORBIN F. SMITH, a citizen of the United States, residing at Moline, in the county of Rock Island and State of Illinois, have invented certain new and useful Improvements in Seed-Planting Mechanism, of which the following is a specification, reference being had therein to the accompanying drawing.

This invention relates to the seed dropping mechanism of seed planting machines designed more particularly for planting cotton seed, and of the type comprising a seed can or hopper provided with an opening for the discharge of the seed, and a rotary dropper plate mounted in the hopper and having seed cells in which the seed are advanced to the point of discharge.

In the planting of cotton seed it is desirable to deposit the seed one at a time at equal intervals, usually three inches apart in straight rows, but owing to the fact that the seed are enveloped in a comparatively thick covering of cotton fibers, great difficulty is encountered in effecting the separation of the individual seed from the mass in the hopper, in effecting their proper entrance into the seed cells in the dropper plate, and in effecting the discharge of the seed from the cells and their delivery to the outside where they may fall to the ground.

My invention aims to overcome these difficulties and others encountered in the planting of cotton seed, and it consists of a dropping mechanism involving various improved features of construction which will be fully described in the specification to follow, and the novel parts of which will be defined in the appended claims.

In the accompanying drawings:

Figure 1 is a plan view looking down into the hopper of a seed dropping mechanism having my invention embodied therein.

Fig. 2 is a side elevation of the same.

Fig. 3 is a sectional elevation through said mechanism on the line $a$—$a$ of Fig. 1.

Fig. 4 is a sectional elevation on the line $b$—$b$ of Fig. 1, showing particularly the means for effecting the dislodgment of the seed from the cells.

Fig. 5 is a horizontal sectional plan view of the same on the line $c$—$c$ of Fig. 4.

Fig. 6 is a fragmentary perspective view of the interior of the hopper at the point of seed discharge, showing the relation of the dropper plate thereto.

Fig. 7 is a vertical sectional elevation on the line $d$—$d$ of Fig. 1 showing the yielding finger for facilitating the lodgment of the seed in the cells.

Fig. 8 is a perspective view of a group of the inclined shelves projecting from the inner side of the hopper.

Fig. 9 is a fragmentary perspective view of the seed hopper in the vicinity of the discharge opening therein.

Referring to the drawings:

1 indicates an upright seed can or hopper to contain the seed to be planted, which hopper is provided with a fixed bottom plate 2. 3 indicates a rotary dropper plate mounted in the bottom of the hopper and which is rotatable about a central vertical axis. This plate is provided with an elevated horizontal flat portion 4, a peripheral vertical flange or shoulder 5, and a series of pointed teeth 6 projecting from the lower edge of the shoulder, the said teeth forming between them seed cells 7 adapted each to receive usually one seed. The teeth 6 are flat and of a vertical thickness less than the smallest dimension of the seed to be planted, and in the rotation of the plate the teeth pass over a horizontal fixed ledge 8 on the bottom plate 2, the movement of the teeth thereover causing the seed in the cells to be advanced along the ledge to a discharge opening 9 in the side of the hopper at which point the seed are dislodged from the cells in the manner to be more fully described hereinafter, and are discharged from the hopper.

The dropper plate may be rotated in any suitable manner, in the present instance its rotation being effected by means of a gear ring 10 rotatably mounted on the bottom plate and provided with upstanding lugs 11 which engage depending driving lugs 12 on the under side of the dropper plate, the gear ring being given its rotary motion by means of a driving gear (not shown) and adapted to engage the gear teeth on the ring.

The under sides of the teeth 6 of the dropper plate are spaced some distance vertically from the upper face of the ledge 8 whereby the effective depth of the seed cells is increased; and the seed carried in the cells will project at some distance respectively above and below the teeth as shown more particularly in Fig. 3, the purpose of which will presently appear.

At the discharge opening 9, the hopper is formed with a horizontal slot 13, through which slot the teeth will pass in the rotation of the plate. An upright deflecting shoulder 14 extends upwardly at the outer edge of the slot and a deflecting shoulder 15 extends downwardly at the said edge of the slot, which shoulders extend at an inclination outwardly in the general direction of rotation of the plate from a point 16 adjacent the base of the teeth to a point 17 adjacent the outer ends of the teeth. These shoulders thus intersect the path of movement of the teeth where they pass through the slot 13 and are therefore disposed in the path of the seed in the cells as they are advanced by the rotation of the plate to the discharge opening. As a result the projecting portions of the seed in the cells will engage the deflecting shoulders as the plate is rotated, and the shoulders will act in effect to positively dislodge the seed from the cells and push them laterally from the dropper plate and effect their discharge as shown in Fig. 5. The ledge 8 is cut away or interrupted as at 8ª at a point some distance beyond the inner ends of the deflecting shoulders so that as the seed approach the end or cut away portion of the ledge, they will as they are dislodged laterally from the cells, be free to fall to the ground.

The deflecting shoulders thus arranged with relation to the horizontal slot 13 form in effect a means fixed relatively to the plate and disposed in the path of the seed advanced by the plate, which means serves to positively dislodge the seed from the cells and effect the discharge of the same from the hopper.

Some distance in advance of the point of discharge, I arrange within the hopper a yielding finger 18 (Figs. 1, 4 and 7) in the form of a horizontal plate extending a slight distance above the teeth and disposed a short distance circumferentially thereof. This finger has fixed to its outer side a horizontal arm 19 which extends outwardly through a slot or opening 20 in the side of the hopper and is seated on a horizontal bracket plate 21 fixed to the hopper. The arm is held yieldingly down on the bracket plate so as to hold the finger yieldingly in its lowermost active position, by means of a spring 22 which encircles a bolt 23 extending loosely through the arm and bracket plate and provided on its lower end with a head 24, and on its upper end with a head 25, and the said spring bearing at its opposite ends respectively against the bracket and head. The purpose of this finger is to facilitate the lodgment of the individual seed in the cells as the cells pass under the finger.

As the teeth on the plate advance toward the finger the seed from the overlying mass are crowded against the end of the finger and the latter will yield upwardly to permit the seed in the cells to pass thereunder, while at the same time it will prevent the seed from packing or crowding into the cells in improper number and will insure the entrance of the individual seed therein.

In order to dislodge any surplus seed which may be carried beneath the yielding finger, and prevent more than the proper number from lodging in the cells and being carried to the discharge opening, I provide a cut-off finger 26 which is arranged over the teeth on the dropper plate just in advance of the horizontal slot 13. This finger is fixed to the inner end of a carrier in the form of an arm 27 which extends outwardly through an opening in the side of the hopper and is provided on its outer end with a horizontal journal 28 mounted in a horizontal bearing 29 in a bracket plate 30 fixed to the outer side of the hopper, as a result of which construction the cut-off finger is movable vertically to and from the teeth on the dropper plate. The cut-off device is spring pressed to hold the same yieldingly down in active position, by means of a spiral expansion spring 31 which is seated between the arm 27 and a horizontal lug 32 projecting inwardly from the bracket plate above the arm, which spring tends to urge the arm, and consequently the cut-off device, down with a yielding pressure.

Means are provided for adjusting the cut-off device vertically to different active positions relatively to the teeth on the dropper plate in order to control the number of seed which are permitted to enter each cell. This adjustment may be effected in any suitable and appropriate manner but I prefer to provide for this purpose a vertical adjusting lever 33 pivoted between its ends on a horizontal axis as at 34 to a vertical extension 35 of the bracket plate 29, the lower end of the lever being provided with an inwardly extending finger 36 loosely engaging the under side of the arm 27. When the lever is shifted on its axis to the right, the horizontal finger will swing upwardly and will lift the arm and consequently elevate the cut-off device to its upper position some distance above the teeth on the dropper plate, in which position of the parts more than one seed will be permitted to remain in a cell and to be advanced to the discharge opening. When the adjusting lever is swung to the left to the opposite position, the finger thereon will be lowered and will permit the arm to be urged downwardly to its lower position adjacent the teeth on the dropper plate, in which position the cut-off device will permit only a single seed in the cells to pass to the discharge opening. Means are provided for holding the adjusting lever in different positions so as to maintain the cut-off device in three adjusted positions. To effect this object, the adjusting lever is pivoted to the extension 35 by means of a horizontal bolt passing loosely through the lever and extension and provided at its outer end with a nut 37 and at its inner end with a head 38, an expansion spring 39 surrounding the bolt between the extension and the nut and serving to hold the lever flatly and yieldingly against the extension. The upper edge of the extension is provided with three sockets 40, 41 and 42 adapted to receive a rounded pin 43 on the inner side of the lever in the different shifted positions of the latter, the pin when so seated serving to hold the lever in the particular adjusted position, and preventing the same from jarring out of position or becoming accidentally displaced. In the movement of the lever from one position to another, the latter will be permitted to yield laterally so that the rounded pin may be disengaged from the socket in which it for the time being was seated and may be engaged in one of the other sockets according to the particular position to which the lever is shifted.

It will be observed from the construction described that although provision is made for adjusting the cut-off device vertically to different active positions relative to the teeth of the dropper plate, the said device will in the different positions of adjustment, be subject to the action of its pressure spring and will therefore be spring pressed.

In order to prevent the overlying mass of seed in the hopper from resting directly on the teeth of the dropper plate, and in order to facilitate the separation of the seed from the mass and assist in their lodgment in the cells, I provide the interior of the hopper at a point closely above the cells with a series of inwardly extending projections or shelves 44 as shown more particularly in Figs. 3 and 8. These shelves are disposed in an inclined position extending at an upward inclination in the general direction of rotation of the plate, the upper end of one shelf being spaced some distance vertically from the lower contiguous end of the next shelf, thereby leaving a space as 44ª between the ends of the shelves. These shelves are disposed at intervals around the interior of the hopper and form in effect a supporting surface above the teeth on the dropper plate, which surface is interrupted at the spaces 44ª between the individual shelves. Thus disposed the shelves support to some extent the mass of seed in the hopper above the cells in the dropper plate, and prevent said mass from acting directly on the teeth and from being packed or crowded into the cells in improper number. At the same time the inclined disposition of the shelves and the spaces between their ends will permit the seed to descend without undue packing and enter the cells in the proper manner.

In order to agitate the mass of seed and effect the individual separation of the same so that they will properly enter the cells, there are extended from the upper side of the dropper plate adjacent the peripheral shoulder 5, a series of agitating lugs 45 shown more particularly in Figs. 1 and 3, which lugs are of flat form with their upper ends beveled and disposed at an inclination with respect to the direction of rotation of the plate, the said lugs inclining inwardly from their outer ends in the general direction of rotation, so that they will present on their advancing sides inclined surfaces to the mass of seed. In the rotation of the plate these lugs act to break up the compacted and massed condition of the seed and thoroughly agitate the same, and in connection with the inclined shelves before described, the seed is thoroughly agitated, its mass formation broken up, the individual seed separated from the mass and their entrance in proper number to the individual cells assisted.

For further agitating the seed, more particularly at the point where they enter the cells, the outer face of the vertical peripheral shoulder 5 on the dropper plate is formed with vertical corrugations, thereby forming vertical agitating lugs 46. These lugs, in the rotation of the plate, will act to turn the seed around and separate them from each other and assist in their lodgment in the seed cells.

In the operation of the mechanism described, the hopper being supplied with a quantity of cotton seed, and the dropper plate being rotated in the direction of the arrow indicated in Fig. 1 with the cut-off device adjusted to dislodge surplus seed and insure the entrance of one seed only into each cell, the agitating lugs 45 on the upper side of the dropper plate and the agitating lugs 46 on the peripheral shoulder of the plate in coöperation with the inclined shelves on the interior of the hopper, will stir and agitate the seed thoroughly, will break up the mass formation and effect the separation of the individual seed therefrom, which will, as the cells advance toward the point of discharge, become lodged therein. Passing under the yielding finger 18, the seed will be further separated and lodged with certainty in the cells, and as the cells approach the cut-off device any surplus seed partially entering the cells with the lodged seed, will be dislodged so that each cell will carry to the point of discharge a single seed projecting above and below the teeth of the dropper plate as shown in Fig. 3. As the teeth pass through the slot 13, the seed seated in the cells will be brought successively into engagement with the upper and lower deflecting shoulders 14 and 14ª which will serve to positively eject the seed therefrom in a lateral direction as they leave the cut-away end of the supporting ledge 8, so that the seed will be discharged with certainty from the hopper and will fall to the ground.

My mechanism in practice has been found to possess unusual effectiveness in the handling of cotton seed in insuring the uniform discharge of the same in proper number and at equal intervals, so that I am enabled to plant cotton seed in straight rows and at proper and equal intervals from each other.

While in the accompanying drawings I have disclosed my invention in the particular detailed construction which I prefer to adopt, it will be understood that these details may be variously changed and modified without departing from the limits of my invention, provided that the mechanism will operate substantially as above described; and it will be understood that the invention is not limited to any particular form or construction of the parts except in so far as such limitations are specified in the claims.

Having thus described my invention, what I claim is:

1. In a seed dropper, the combination of a hopper provided with an opening for the discharge of the seed, a rotary dropper plate mounted in the hopper and provided with seed cells adapted in the rotation of the plate to carry the seed to the point of discharge, and relatively fixed means disposed adjacent said discharge opening and in the path of the seed advanced by the plate, said means serving to dislodge the seed from the cells.

2. In a seed dropper, the combination of a hopper provided with an opening for the discharge of the seed, a rotary dropper plate mounted in the hopper and provided with seed cells adapted in the rotation of the plate to advance the seed to the discharge opening, and a fixed deflecting shoulder adjacent said opening and disposed in the path of the seed advanced by the plate, said shoulder serving to dislodge the seed from the cells.

3. In a seed dropper, the combination of a hopper provided with an opening for the discharge of the seed, a rotary dropper plate mounted in the hopper and provided with seed cells adapted in the rotation of the plate to advance the seed to the point of discharge, and a fixed deflecting shoulder adjacent said opening extending at an inclination relative to the path of movement of the cells and disposed in the path of the seed advanced by the cells; whereby said shoulder will serve to dislodge the seed from the cells.

4. In a seed dropper, the combination of a hopper provided with a horizontal slot through the side thereof, a rotary dropper plate mounted in the hopper and provided with teeth forming seed cells between them adapted in the rotation of the plate to pass through said slot, and a shoulder at the outer edge of the slot disposed in the path of movement of the seed advanced by the plate, and serving to dislodge the seed from the cells.

5. In a seed dropper, the combination of a hopper provided with a horizontal slot through the side thereof, a rotary dropper plate mounted in the hopper and provided with teeth forming seed cells between them, the said teeth being adapted in the rotation of the plate to pass through said slot, and upper and lower shoulders at the outer edge of the walls of the slot, said shoulders being disposed in the path of movement of the seed advanced by the plate and serving to dislodge the seed from the cells.

6. In a seed dropper, the combination of a hopper provided with a horizontal slot extending through the side thereof, a rotary dropper plate mounted in the hopper and provided with teeth forming seed cells between them, said teeth being adapted in the rotation of the plate to pass through the slot, and a fixed shoulder at the outer edge of the slot extending from a point adjacent the base line of the cells, at an inclination outwardly in the general direction of movement of the cells to a point adjacent the outer ends of the cells, and disposed in the path of movement of the seed advanced by the plate.

7. In a seed dropper, the combination of a hopper provided with a horizontal bottom ledge and with a horizontal slot extending through the side of the hopper, the said ledge being cut away adjacent the slot to permit the seed to fall, a rotary dropper plate mounted in the bottom of the hopper and provided with teeth forming seed cells between them, and adapted in the rotation of the plate to pass through said slot and advance the seed to the point of discharge supported by said horizontal ledge, and relatively fixed means disposed adjacent said slot in position to be engaged by the seed as they approach the cut away portion of the ledge and serving to dislodge the seed from the cells.

8. In a seed dropper, the combination of a hopper provided with a horizontal slot through the side thereof, a rotary dropper plate mounted in the hopper and provided with teeth forming seed cells between them, said teeth adapted in the rotation of the plate to pass through the slot, relatively fixed means disposed adjacent said slot in position to be engaged by the seed as they are advanced by the plate, and a cut off device coöperating with the cells in the plate before they enter the slot, and acting to dislodge surplus seed from the cells.

9. In a seed dropper, the combination of a hopper provided with an opening for the discharge of seed, a rotary dropper plate mounted in the hopper and provided with seed cells adapted in the rotation of the plate to advance the seed to the point of discharge, a cut off device coöperating with the cells to dislodge surplus seed, and a carrier for said cut off device extending through the hopper and sustained at the outer side of the same, and means for adjusting said carrier to vary the distance between the cut-off device and the seed cells.

10. In a seed dropper, the combination of a hopper provided with an opening for the discharge of seed, a rotary dropper plate mounted in the hopper and provided with seed cells adapted in the rotation of the plate to advance the seed to the point of discharge, a cut-off device coöperating with the cells to dislodge the surplus seed and movable to and from said cells, a spring acting on said device to urge it yieldingly toward the cells, a carrier for said cut-off device extending through the hopper and sustained at the outer side of the same, and means for adjusting said carrier to vary the distance between the cut-off device and the seed cells while said cut-off device is subject to the action of the spring.

11. In a seed dropper, the combination of a hopper provided with an opening for the discharge of seed, a rotary dropper plate mounted in the hopper and provided with seed cells adapted in the rotation of the plate to advance the seed to the point of discharge, a cut off device coöperating with the cells in dislodging surplus seed, a carrier for the cut off device extending through the hopper to the outside, a bearing at the outside of the hopper, a journal on the carrier mounted in the bearing to permit the cut off device to be adjusted to and from the dropper plate, and an adjusting lever sustained on the outside of the hopper and engaging the carrier to adjust the same.

12. In a seed dropper, the combination of a hopper provided with an opening for the discharge of seed, a rotary dropper plate mounted in the hopper and provided with seed cells adapted in the rotation of the plate to advance the seed to the point of discharge, a cut off device coöperating with the seed cells in dislodging surplus seed, a carrier for the cut off device, a bearing sustained by the hopper, a journal on the carrier mounted in said bearing to permit the cut off device to be adjusted to and from the dropper plate, and an adjusting lever sustained by the hopper and engaging the carrier to adjust the same.

13. In a seed dropper, the combination of a hopper provided with an opening for the discharge of seed, a rotary dropper plate mounted in the hopper and provided with seed cells adapted in the rotation of the plate to advance the seed to the point of discharge, a cut off device coöperating with the cells in dislodging surplus seed, and a yielding finger arranged in advance of the cut off device and coöperating with the dropper plate in facilitating the lodgment of the seed in the cells.

14. In a seed dropper, the combination of a hopper provided with an opening for the discharge of seed, a rotary dropper plate mounted in the hopper and provided with seed cells adapted in the rotation of the plate to advance the seed to the point of discharge, relatively fixed means adjacent the point of discharge in position to be engaged by the seed as they are advanced by the plate and serving to dislodge the seed from the cells and effect their discharge, a cut off device in advance of the discharge opening coöperating with the cells in dislodging surplus seed, and a yielding finger in advance of the cut off device and coöperating with the cells in facilitating the lodgment of the seed therein.

15. In a seed dropper, the combination of a hopper provided with a horizontal slot through the side thereof, a rotary dropper plate mounted in the hopper and provided at its peripheral edge with horizontal teeth of less thickness than the smallest dimension of the seed, said teeth forming seed cells between them, and adapted in the rotation of the plate to pass through said slot with the seed projecting above and below the teeth, and a fixed deflecting shoulder adjacent the slot in position to be engaged by the projecting portions of the seed advanced by the plate and serving to dislodge the seed from the cells therein.

16. In a seed dropper, the combination of a hopper provided with an opening for the discharge of the seed, and a rotary dropper plate mounted in the hopper and provided with seed cells adapted in the rotation of the plate to advance the seed to the point of discharge, the seed plate being provided at a point inward of the cells with a peripheral concentric shoulder having agitating lugs thereon.

17. In a seed dropper, the combination of a hopper provided with an opening for the discharge of seed, and a rotary dropper plate mounted in the hopper and formed at its periphery with seed cells adapted in the rotation of the plate to advance the seed to the point of discharge, said plate being provided inward of the cells with a vertical peripheral concentric shoulder having vertical corrugations therein forming seed agitating lugs.

18. In a seed dropper, the combination of a hopper provided with an opening for the discharge of the seed, a rotary dropper plate mounted in the hopper and provided with seed cells adapted in the rotation of the plate to advance the seed to the point of discharge, and a series of shelves projecting inwardly from the interior of the hopper above the seed cells, the end of one shelf being spaced vertically from the adjacent end of the next shelf, and said ends being in close proximity to each other circumferentially.

19. In a seed dropper, the combination of a hopper provided with an opening for the discharge of the seed, a rotary dropper plate mounted in the hopper and provided with seed cells adapted in the rotation of the plate to advance the seed to the point of discharge, and a series of inclined shelves projecting inwardly from the interior of the hopper at intervals around the same and disposed above the seed cells, the end of one shelf being spaced vertically from the adjacent end of the adjacent shelf, said ends being in close proximity to each other.

20. In a seed dropper, the combination of a hopper provided with an opening for the discharge of the seed, a rotary dropper plate mounted in the hopper and provided with seed cells adapted in the rotation of the plate to advance the seed to the point of discharge, and a series of shelves projecting inwardly from the interior of the hopper above the seed cells, said shelves extending at an upward inclination in the general direction of the rotation of the plate, with the forward end of one shelf disposed over the rear end of the next shelf in advance.

21. In a seed dropper, the combination of a hopper provided with an opening for the discharge of the seed, a rotary dropper plate mounted in the hopper and provided with seed cells adapted in the rotation of the plate to advance the seed to the point of discharge, and agitating lugs projecting upwardly from the plate and inclined forwardly from their outer ends in the general direction of movement of the plate, said lugs having their upper ends beveled.

22. In a seed dropper, the combination of a hopper provided with an opening for the discharge of the seed, a rotary dropper plate mounted in the hopper and provided with seed cells adapted in the rotation of the plate to advance the seed to the point of discharge, a series of agitating lugs extending upwardly from the plate, and a series of shelves projecting inwardly from the inner side of the hopper and disposed above the seed cells, the agitating lugs in the rotation of the plate coöperating with said shelves in agitating the seed and facilitating their passage to the cells.

In testimony whereof, I have affixed my signature.

ORBIN F. SMITH.

Copies of this patent may be obtained for five cents each, by addressing the "Commissioner of Patents, Washington, D. C."